United States Patent [19]
DeSousa

[11] Patent Number: 4,557,161
[45] Date of Patent: Dec. 10, 1985

[54] INFINITELY VARIABLE ROTARY DRIVE TRANSMISSION

[76] Inventor: Egas J. DeSousa, 8373 Meadowdale, Grand Blanc, Mich. 48439

[21] Appl. No.: 554,009

[22] Filed: Nov. 21, 1983

[51] Int. Cl.⁴ ............................................. F16H 35/08
[52] U.S. Cl. ......................................... 74/837; 74/121; 74/123; 74/600
[58] Field of Search .................. 74/117, 121, 123, 124, 74/600, 837

[56] References Cited

U.S. PATENT DOCUMENTS

| | | | |
|---|---|---|---|
| 561,260 | 6/1886 | Grimme | 74/121 |
| 838,700 | 12/1906 | Engleman | 74/600 |
| 963,016 | 6/1910 | White | 74/600 |
| 971,744 | 10/1910 | Godeau | 74/121 |
| 977,252 | 11/1910 | Zierath | 74/600 |
| 1,190,764 | 7/1916 | Hazen | 74/121 |
| 1,268,140 | 6/1918 | Nagel | 74/121 |
| 1,301,982 | 4/1919 | Smith | 74/121 |
| 2,319,485 | 5/1943 | Alabrune | 74/600 |
| 3,321,984 | 5/1967 | Nittka | 74/117 |

FOREIGN PATENT DOCUMENTS 330634 10/1935 Italy ........................................ 74/121

Primary Examiner—Alan Cohan
Assistant Examiner—John A. Rivell
Attorney, Agent, or Firm—Gifford, VanOphem, Sheridan & Sprinkle

[57] ABSTRACT

The present invention provides an infinitely variable rotary drive transmission having an input member and an output member rotatably mounted to a housing. A slide is linearly reciprocally mounted to the housing in a direction substantially radial with respect to the axis of the input member. The input member rotatably drives an articulated shaft which is connected to the slide by rods so that the input member reciprocally linearly drives the slide. The slide in turn is connected to and rotatably drives the output member through a pair of cooperating clutch assemblies. A bottle screw varies the degree of articulation of the articulated shaft which, in turn, varies the stroke of the slide per revolution of the input shaft to thereby vary the rotational speed of the output member. A shift assembly is operable to reverse the direction of rotation of the output member as desired.

7 Claims, 7 Drawing Figures

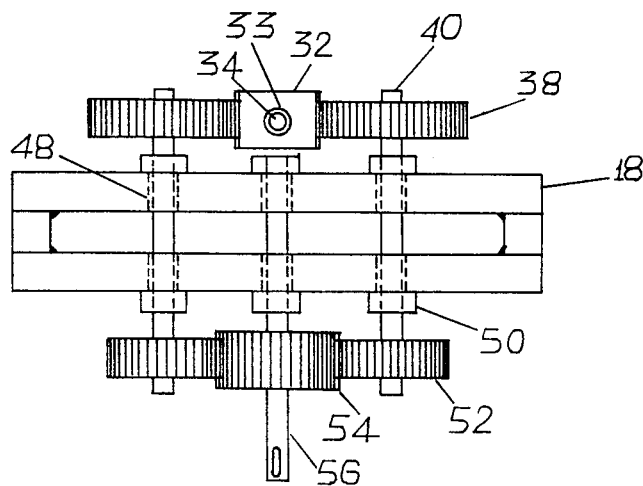
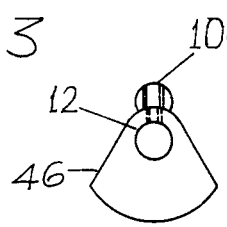
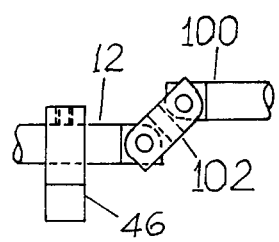
FIG 3          FIG 4    FIG 5
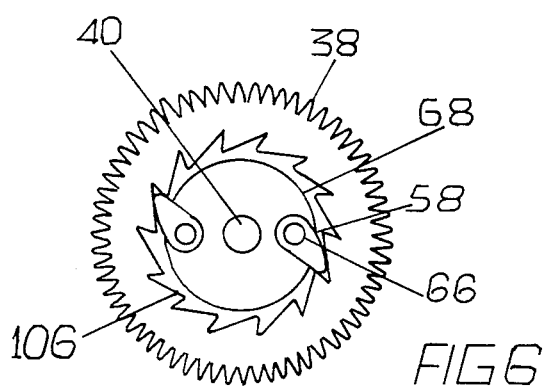
FIG 6
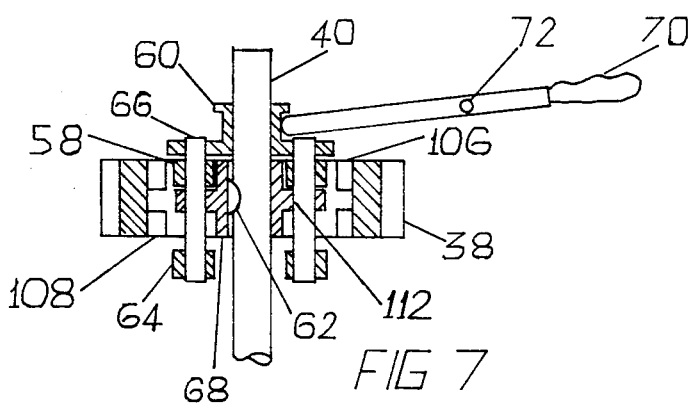
FIG 7

INFINITELY VARIABLE ROTARY DRIVE TRANSMISSION

BACKGROUND OF THE INVENTION

I. Field of the Invention

The present invention relates generally to transmission and, more particularly, to an infinitely variable and reversible rotary drive transmission.

II. Description of the Prior Art

There are a number of previously known variable rotary drive transmissions, also known as speed variators, which drivingly connect an input shaft to an output shaft at a variable ratio. These previously known devices, however, are disadvantageously complex, bulky and expensive in construction. Furthermore, a number of these previously known devices require external power, such as electricity, in order to operate.

SUMMARY OF THE PRESENT INVENTION

The present invention provides an infinitely variable and reversible rotary drive transmission which overcomes all of the above mentioned disadvantages of the previously known devices.

In brief the transmission of the present invention comprises an input member and an output member rotatably mounted to a housing. The input member drives an articulated shaft having a crank portion radially offset from the axis of the input member while a bottle screw adjusts the degree of articulation of the shaft, i.e. the radial spacing between the axis of the input member and the articulated shaft crank portion.

A slide is linearly reciprocally mounted to the housing in the direction substantially radial with respect to the axis of the input member. A pair of connecting rods extend between the slide and the articulated shaft crank portion so that the slide reciprocates in unison with the rotation of the input member. In addition, the stroke of the slide, i.e. the length of travel of the slide, is directly proportional to the degree of articulation of the articulated shaft.

The reciprocation of the slide, in turn, rotatably drives the output shaft through a pair of cooperating and oppositely acting clutch assemblies. One clutch assembly rotatably drives the output shaft in a predetermined direction as the slide reciprocates in one direction while the other clutch assembly rotatably drives the shaft in the predetermined direction as the slide reciprocates in the opposite direction. Both clutch assemblies include a reversing means which reverses the direction of rotation of the output shaft.

The bottle screw which varies the articulation of the shaft and thus the stroke of the slide, varies the drive ratio between the input and output members.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 3 is a sectional view taken substantially along lines 3—3 in FIG. 1 and with parts removed for clarity;

FIG. 4 is a view taken substantially along lines 4—4 in FIG. 2, with parts removed and enlarged for clarity;

FIG. 5 is a fragmentary view illustrating a portion of the preferred embodiment of the invention;

FIG. 6 is a plan view illustrating a preferred form of the clutch assembly of the present invention; and FIG. 7 is a fragmentary partial sectional view of the preferred clutch assembly in the preferred embodiment of the present invention.

DETAILED DESCRIPTION OF A PREFERRED EMBODIMENT OF THE PRESENT INVENTION

Figure 1:
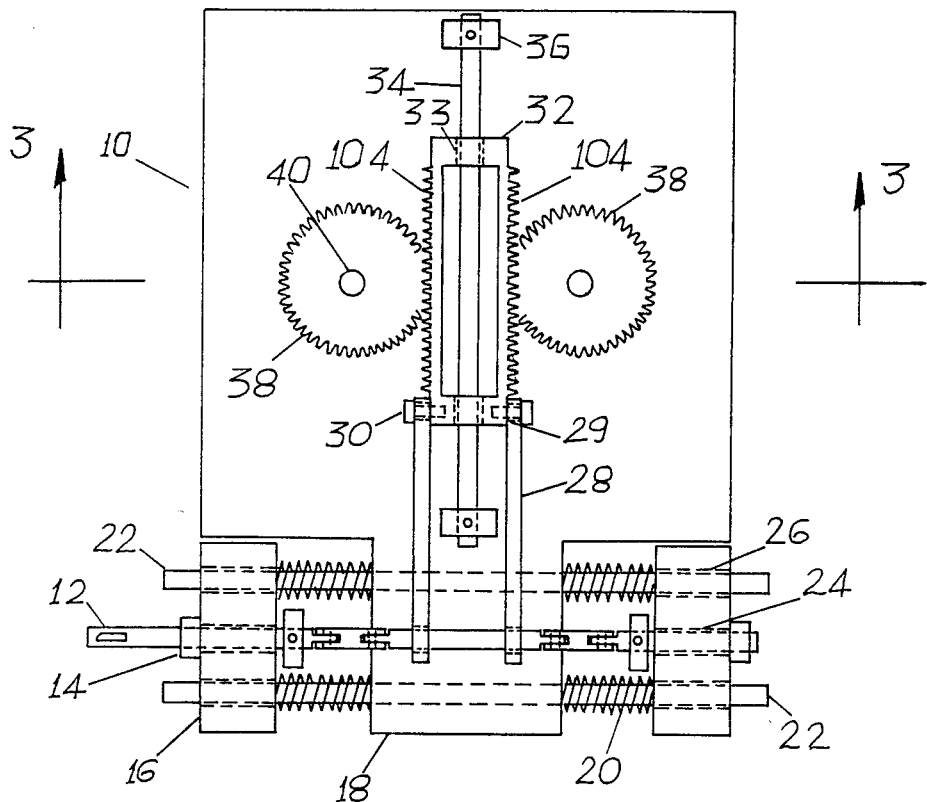
FIG. 1 is a top view illustrating a preferred embodiment of the invention.
Figure 2:
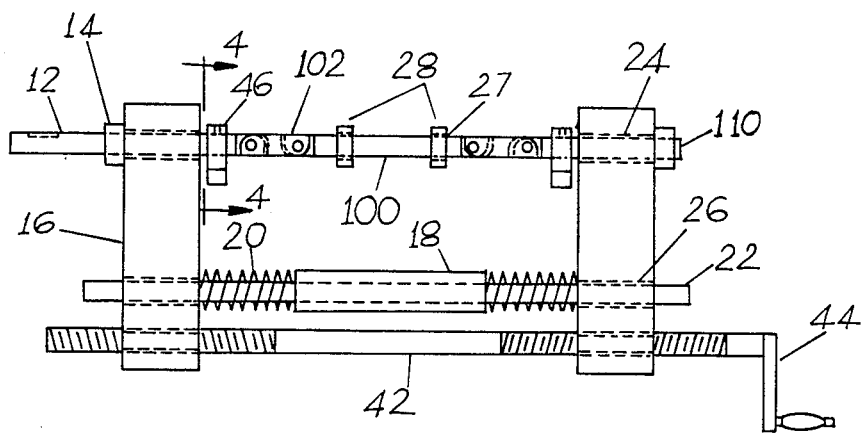
FIG. 2 is a front view of the preferred embodiment of the invention and with parts removed for clarity.

With reference first to FIGS. 1 and 2 a preferred embodiment of the transmission or speed variator 10 is thereshown and comprises a housing 18. A pair of spaced and parallel rods 22 are secured to one end of the housing 18 by any conventional means so that each end of each rod 22 is free.

Still referring to FIGS. 1 and 2, a pair of spaced and parallel brackets 16 are slidably mounted to the rods 22 by sleeve bearings 26 so that the brackets 16 can slide toward and away from each other along the rods 22. Four compression springs 20 are positioned around the rods 22 so that one spring 20 is sandwiched between the housing 18 and each bracket 16. A bottle screw 42 having a crank handle 44 is threadably mounted to both brackets 16 so that rotation of the bottle screw 42 by its handle 44 varies the spacing between the brackets 16. The purpose of the bottle screw 42 will be subsequently described in greater detail.

An input member or shaft 12 is rotatably mounted by a collar 14 and sleeve bearing 24 to one bracket 16 while a second shaft 110 is rotatably mounted by a collar 14 and sleeve bearing 24 to the other bracket 16 so that the shafts 12 and 110 are coaxial with each other. The shafts 12 and 110 are thus free to rotate in the brackets 16 but are constrained against axial movement with respect to the brackets 16 by the collars 14.

With reference now particularly to FIGS. 2 and 5, the transmission 10 further comprises an articulated shaft having a central crank portion 100 and two link segments 102. One end of each link segment 102 is pivotally secured to each end of the central crank portion 100 while the other ends of the link segments 102 are pivotally secured to the shafts 12 and 110. Thus, upon rotation of the bottle screw 42 to move the brackets 16 closer to each other, the articulated shaft moves from the position shown in FIG. 2 and to the position shown in FIG. 5 in which the crank portion 100 is radially spaced from the axes of the shafts 12 and 110. The degree of articulation, i.e. the radial spacing between the crank portion 100 and the axis of the input shaft 12, is infinitely variable depending upon the amount of rotation of the bottle screw 42. In addition, as shown in FIGS. 2, 4 and 5, a pair of counterweights 46 are preferably secured to the input shaft 12 and the shaft 110 and extend in the direction opposite from the articulation of the crank portion 100.

With reference now to FIGS. 1 and 3, an elongated slide 32 is mounted by sleeve bearings 33 to a guide rod 34 secured to the housing 18 by mounting brackets 36. The rod 34 extends radially with respect to the axis of the input shaft 12 so that the slide 32 is reciprocally linearly moveable with respect to the axis of the input shaft 12. The slide 32, furthermore, includes a gear rack 104 on each side and these gear racks 104 mesh with pinions 38 rotatably mounted to the housing 18 by axles 40. Consequently, reciprocation of the slide 32 along the rod 34 simultaneously rotatably drives the pinions 38 but in opposite directions.

With reference now particularly to FIG. 1, a pair of connecting rods 28 are pivotally secured at one end by pins 30 and bearings 29 to one end of the slide 32. The other ends of the rods 28 are connected by bearings 27 to the crank portion 100 of the articulated shaft. Consequently, assuming that the articulated shaft is in the position shown in FIG. 5, rotation of the input shaft 12 linearly reciprocally drives the slide 32 with a stroke proportional to the amount of articulation of the articulated shaft.

With reference now to FIG. 7, a hub 68 is secured to each shaft 40 by a key 62 so that the shaft 40 and hub 68 rotate with each other. A second hub 60 is axially slidably positioned on each shaft 40 above the pinions 38 while rods 66 are secured to the hub 60 and slidably extend through receiving bores 112 in the hub 68 to drivingly connect the hubs 60 and 68 together.

With reference now particularly to FIGS. 6 and 7, each pinion 38 includes an upper and lower ratchet 106 which extend in opposite directions from each other. Furthermore, the upper ratchet in one pinion 38 extends in the opposite direction from the corresponding upper ratchet 106 in the other pinion 38 for a reason to be subsequently described. A pair of pivotal dogs 64 and 58 are, in turn, secured to each rod 66 so that, with the hub 60 in its lower position as shown in FIG. 7, the upper dogs 58 cooperate with the upper ratchets 106. Conversely, with the hub 60 in its upper position the lower dogs 64 cooperate with the lower ratchets 106. A lever 70 pivotally mounted at 72 engages the hub 60 to move the hub 60 between its upper and lower positions.

With reference now to FIG. 3, a pinion 52 is secured to each axle 40. The pinions 52 in turn both mesh with a further pinion 54 which is rotatably mounted to the housing 18 by an output shaft 56.

The ratchets 106 together with their dogs 58 or 64 form a one way clutch which transmits rotation of the pinion 38 in only one direction to its associated axle 40. Conversely, the clutch releases when the pinion 38 is rotatably driven in the opposite direction. Furthermore, since the clutch engagement is reversed for the pinions 38, reciprocation of the slide 32 in one direction engages only one of the clutches to rotatably drive only one shaft 40 while, conversely, reciprocation of the slide 32 in the opposite direction engages the other clutch to rotatably drive the other shaft 40. The rotation of each shaft 40 is transmitted through the pinions 52 and 54 to the output shaft 56.

The axial displacement of the hub 60 by the lever 70 between its upper and lower positions reverses the direction of engagement of the clutch for each pinion 38. This reversal, in turn, reverses the direction of rotation of the output shaft 56 but does not change the rotational speed of the output shaft 56.

As has been previously described, the degree of articulation of the articulated shaft, i.e. the radial offset of the clamp portion 100 from the axis of rotation of the input shaft 12, is adjustable by rotation of the bottle screw 42. The degree of articulation of the articulated shaft, in turn, varies the stroke of the slide 32, the rotational speed of the pinions 38 and, correspondingly, the rotational speed of the output shaft 56. In the preferred form of the invention, the articulation of the articulated shaft can be infinitely varied from zero, as shown in FIG. 2 in which there is no reciprocation of the slide 32, and a predetermined maximum amount in which the crank portion 100 of the articulated shaft is spaced its maximum amount away from the axis of the input shaft 12.

From the foregoing, it can be seen that the present invention provides an infinitely variably and reversible rotary drive transmission or speed variator, which is simple in construction and yet wholly effective in operation.

Having described my invention, however, many modifications thereto will become apparent to those skilled in the art without deviation from the spirit of the invention. For example, different clutch assemblies may be employed and different cam mechanisms may be used to vary articulation of the shaft while remaining within the spirit and scope of the invention. Furthermore, in some applications it may be desirable to utilize a pair of transmissions in which the strokes of the slides 32 are out of phase from each other by 90 degrees in order to avoid any hesitation of the output shaft 56 at slow speeds.

I claim:

1. An infinitely variable rotary drive transmission comprising a housing,
   an input member rotatably mounted to said housing,
   an output member rotatably mounted to said housing,
   means for drivingly connecting said rotary input member to said rotary output member comprising:
   a slide and means for linearly reciprocally slidably mounting said slide to said housing,
   means for drivingly connecting said input member to said slide so that said slide reciprocates in unison with the rotation of said input member,
   means for variably adjusting the stroke of said slide between a minimum and maximum stroke,
   means for drivingly connecting said slide to said output member so that said output member rotates at a speed proportional to the stroke of said slide wherein said input member connecting means comprises an articulated shaft, said shaft connected to and coaxial with said input member, said shaft having a crank portion parallel to but radially spaced from the axis of the input member, and means for connecting said crank portion to said slide and wherein said variable adjustment means comprises means operable during rotation of said input member for varying the articulation of said articulated shaft.

2. The invention as defined in claim 1 wherein said stroke adjusting means comprises means for adjusting the radial spacing between said input member axis and said crank portion.

3. The invention as defined in claim 2 wherein said last mentioned means is infinitely variable between an inner radial limit and an outer radial limit.

4. The invention as defined in claim 1 wherein said articulated shaft comprises a pair of axially spaced and coaxial shafts, a pair of link segments, one end of each link segment being pivotally connected to an end of each coaxial shaft so that the other ends of the link segments face each other, a crank portion pivotally secured between said other ends of said link segments, and means for varying the axial spacing of said coaxial shafts.

5. The invention as defined in claim 1 wherein said output member connecting means comprises a pair of gear racks secured to said slide, a driven gear rotatably mounted to said housing and in mesh with each rack, an output gear connected to said output member, and clutch means for rotatably drivingly connecting said output gear with one of said driven gears when said slide moves in one direction and for drivingly connecting said output gear with the other driven gear when said slide moves in the opposite direction.

6. The invention as defined in claim 5 and comprising means for selectively drivingly connecting either driven gear with said output gear when said slide moves in one direction and for drivingly connecting the other driven gear with said output gear when said slide moves in the opposite direction.

7. The invention as defined in claim 5 wherein said clutch means comprises a ratchet clutch.

* * * * *